United States Patent [19]
Kobayashi

[11] Patent Number: 5,706,547
[45] Date of Patent: Jan. 13, 1998

[54] WIPER DEVICE FOR VEHICLE

[75] Inventor: Toshio Kobayashi, Kanagawa-ken, Japan

[73] Assignee: Nissan Motor Co., Ltd., Kanagawa-ken, Japan

[21] Appl. No.: 767,776

[22] Filed: Dec. 17, 1996

[30] Foreign Application Priority Data

Dec. 25, 1995 [JP] Japan ................... 7-336933

[51] Int. Cl.⁶ ................... B60S 1/06; B60S 1/24
[52] U.S. Cl. ................ 15/250.3; 15/250.31; 74/51; 403/291; 403/24; 403/224; 403/220; 248/214
[58] Field of Search ............ 15/250.3, 250.31, 15/250.27, 250.28, 250.16, 250.34; 74/42, 51; 248/274.1, 200, 214; 403/24, 291, 220, 224

[56] References Cited

U.S. PATENT DOCUMENTS

| | | | |
|---|---|---|---|
| 5,074,613 | 12/1991 | Unterborn et al. | 15/250.31 |
| 5,165,159 | 11/1992 | Egner-Walter et al. | 15/250.31 |
| 5,222,706 | 6/1993 | Hoshino | 15/250.31 |
| 5,261,286 | 11/1993 | Hayashi | 15/250.3 |
| 5,271,120 | 12/1993 | Eustache et al. | 15/250.3 |
| 5,396,681 | 3/1995 | Hara | 15/250.3 |
| 5,441,227 | 8/1995 | Hayashi | 15/250.3 |

FOREIGN PATENT DOCUMENTS

| | | | |
|---|---|---|---|
| 359733 | 3/1990 | European Pat. Off. | 15/250.3 |
| 2621287 | 4/1989 | France | 15/250.3 |
| 2640211 | 6/1990 | France | 15/250.31 |
| 5-32152 | 2/1993 | Japan | 15/250.3 |
| 2219932 | 12/1989 | United Kingdom | 15/250.3 |
| 2227926 | 8/1990 | United Kingdom | 15/250.3 |

OTHER PUBLICATIONS

"Camry", Toyota Motor Co., Ltd., Jul. 1, 1994, pp. 5-28.

*Primary Examiner*—Gary K. Graham
*Attorney, Agent, or Firm*—Lowe, Price, LeBlanc & Becker

[57] ABSTRACT

A wiper device for a vehicle includes a pair of left and right pivot brackets. The pivot brackets are pivotably attached to a vehicle body through a pair of left and right elastic members at left and right mounting points, respectively. The wiper device has a connecting member for connecting the left pivot bracket with the right pivot bracket. A wiper motor unit includes a wiper motor and an unit bracket for mounting the wiper motor. The unit bracket is attached to the vehicle body through a center elastic member at a center mounting point shifted from an imaginary line passing through the left and right mounting points. Further, the unit bracket of the wiper motor unit is positioned on the connecting member so that a gravity center of the wiper motor unit rides on the imaginary line. With the arrangement of the wiper motor unit, it is possible to restrain the rotational moment about the imaginary line and realize the compatibility of avoiding an interference of the wiper device with the vehicle body while improving the vibration isolating effect thereby to reduce the operational noise of the wiper motor unit.

8 Claims, 5 Drawing Sheets

WIPER DEVICE FOR VEHICLE

BACKGROUND OF THE INVENTION

1. Field of the Invention

The present invention relates to a wiper device installed in a vehicle such as an automobile, and particularly, it relates to a so-called "flame integrated" wiper device in which a pair of pivot brackets and a wiper motor unit are linked with each other through the intermediary of a connecting member in the form of a pipe, in order to enhance total rigidity of the device.

2. Description of the Related Art

For example, the above-mentioned type of wiper device is shown in the "CAMRY" service manual published by TOYOTA motor Co. Ltd., on Jul. 1, 1994 (page 5–28). In the publication, the wiper device comprises a pair of left and right pivot brackets as a wiper pivot arrangement, and an unit bracket for mounting a wiper motor unit secured on a pipe member. In arrangement, the pivot brackets and the unit bracket are attached to a vehicle body, so that the wiper device is assembled on the vehicle body at three mounting points, stably. In addition, elastic members such as rubber, are respectively provided at the mounting points in order to prevent operational noise of the wiper motor from transmitting to the vehicle body.

In the above-mentioned wiper device, it is desirable to lower spring constant of the elastic members as much as possible, in order to enhance vibration isolating effect of the wiper device.

However, such a lowered establishment in spring constant would cause the elastic members to be deformed easily, so that the wiper device would interfere with the vehicle body to produce noise. This is because, in vehicle's accelerating or decelerating, the rotational moment will be produced about a line linking the pivot brackets with each other by the weight of the wiper motor unit and applied on the respective mounting points.

Under such a circumstance, the spring constant of the elastic members cannot but be established higher to some degree. Consequently, there has been caused a problem to influence the vibration isolating effect of the elastic members.

SUMMARY OF THE INVENTION

It is therefore an object of the present invention, not to mention to mount a wiper device on a vehicle body stably, to provide the wiper device which is capable of lowering spring constant of the elastic members as possible without causing an interference of the wiper device with a vehicle body during the vehicle's accelerating or decelerating, whereby it is possible to realize compatibility of improving the vibration isolating effect of the wiper device while preventing it from interfering with the vehicle body.

The object of the present invention described above can be accomplished by a wiper device for a vehicle, comprising:

a pair of left and right pivot brackets pivotably attached to a vehicle body of the vehicle through intermediary of a pair of left and right elastic members at left and right mounting points on the vehicle body, respectively;

a pair of wiper arms attached to respective ends of the left and right pivot brackets for wiping a windshield of the vehicle;

a connecting member having one end linked to the end of the left pivot bracket and the other end linked to the end of the right pivot bracket;

a wiper motor unit arranged between the left pivot bracket and the right pivot bracket, the wiper motor unit including a wiper motor for pivoting the wiper arms and an unit bracket for mounting the wiper motor thereon, the unit bracket being attached to the vehicle body through a center elastic member at a center mounting point shifted from an imaginary line passing through both of the left and right mounting points forwardly;

a pair of left and right pivot arms attached to the ends of the left and right pivot brackets respectively;

a first linking member having respective ends linked to ends of the left and right pivot arm through ball joints, respectively; and a second linking member having one end associated with the wiper motor and the other end linked to either end of the first link;

wherein the unit bracket of the wiper motor unit is positioned on the connecting member so that a gravity center of the wiper motor unit rides on the imaginary line. With the arrangement of the wiper motor unit, it is possible to restrain the rotational moment about the imaginary line which may be caused by the weight of the wiper unit motor during vehicle's accelerating or decelerating. Consequently, it allows the left and right mounting points of the pivot brackets and the center mounting point of the wiper motor unit to be fixed securely, so that the mounting stability of the wiper device against the vehicle body can be enhanced furthermore. Further, it is possible to restrain that torsion forces derived from the rotational moment are applied on the respective mounting points. Therefore, even if establishing the spring constant of the elastic members to be reduced, it would be excluded that the elastic members are bent in front and behind in acceleration or deceleration so that the wiper device interferes with the vehicle body. In conclusion, according to the above-mentioned arrangement, it is possible to realize the compatibility of avoiding an interference of the wiper device with the vehicle body while improving the vibration isolating effect thereby to reduce the operational noise of the wiper motor unit.

For the arrangement of the wiper motor unit, the connecting member may be bent forwardly so that the gravity center of the wiper motor unit rides on the imaginary line.

Additionally, in the present invention, the connecting member may be in the form of a pipe.

Preferably, the center elastic member is provided, in a direction perpendicular to the imaginary line, with a front portion of which spring constant is increased in comparison with that of the other portions of the center elastic member. In this case, while maintaining the elastic supportability of the front portion which would be subjected to reactive force at the wiper arms' pivotal movements, it is possible to establish the spring constant of the other portions besides the front portion to be lower, so that noise of the operating wiper motor unit can be reduced furthermore.

For the above arrangement, the front portion of the center elastic member may be formed to project radially outward, providing a fan-shaped configuration. In this case, the contact area of the front portion with the vehicle body can be increased thereby to progress the elastic supporting stability.

Alternatively, the front portion may be made of elastic material different from that of the other portions of the center elastic member. In this case, the simple configuration of the center elastic member can be maintained to facilitate the lay-out arrangement of the center elastic member.

Note, the center elastic member has a circumferential groove formed thereabout for engagement with the unit bracket.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

One embodiment of the present invention will be described with reference to the accompanying drawings hereinafter.

Figure 1:
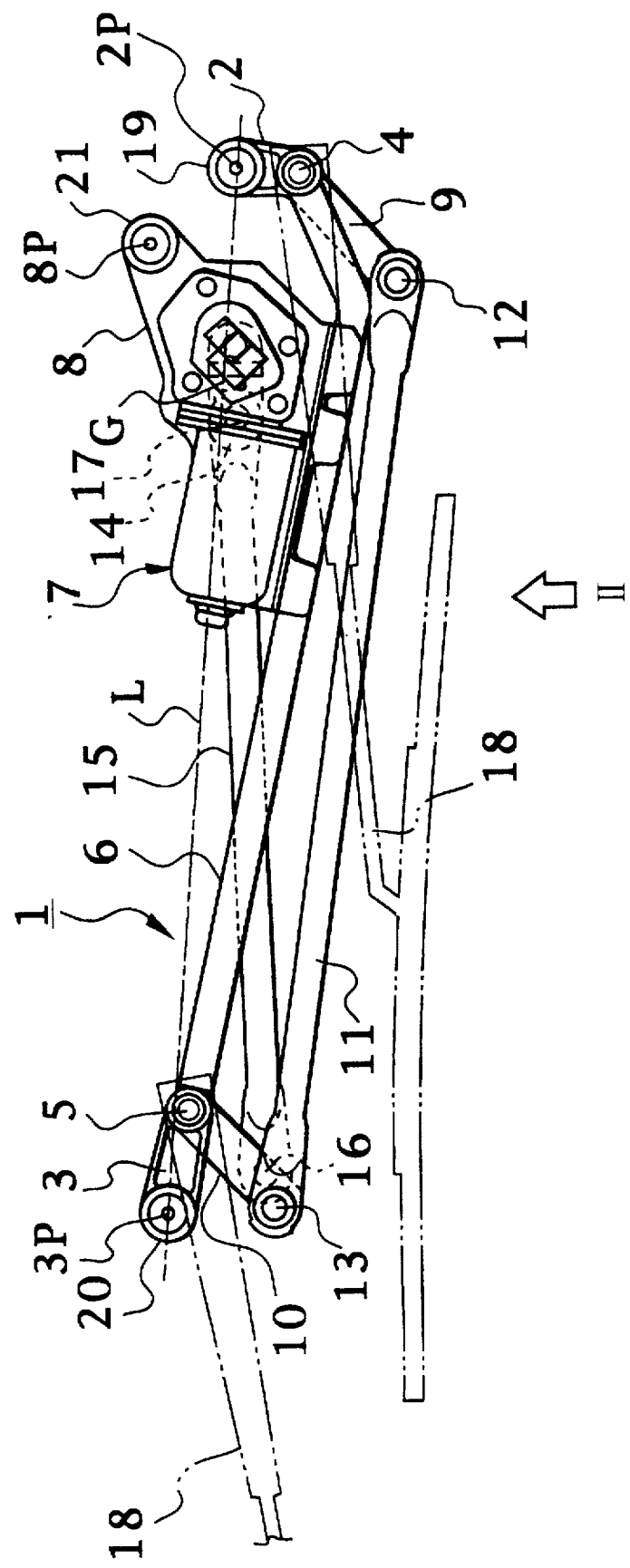
FIG. 1 is a plan view of a wiper device for a vehicle, in accordance with one embodiment of the present invention.
Figure 2:
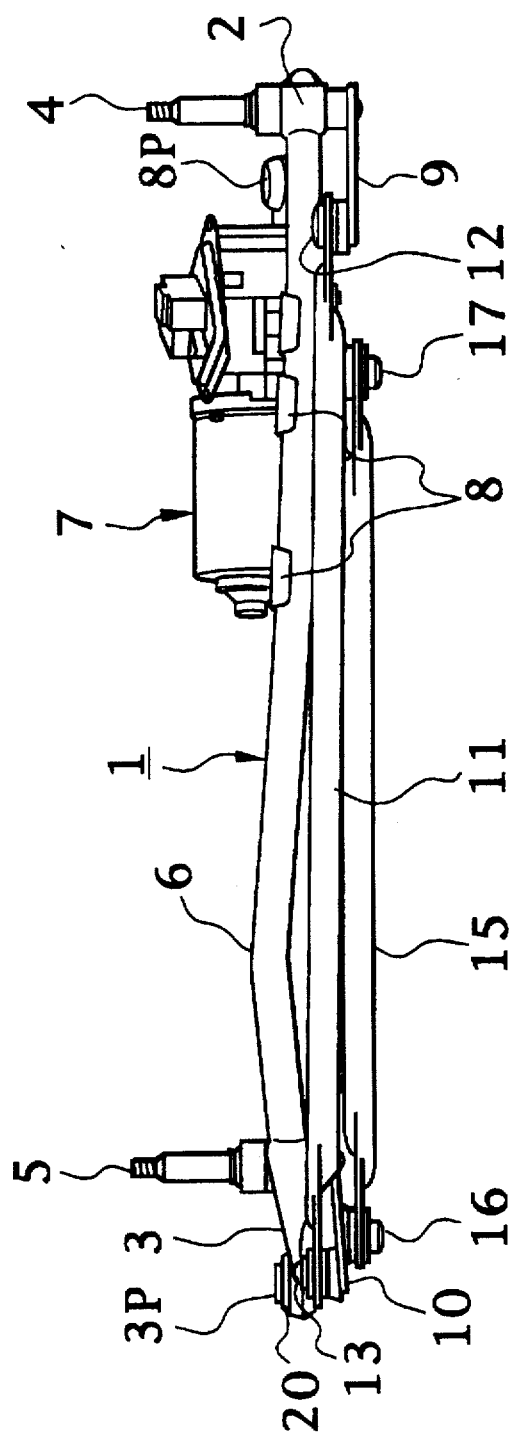
FIG. 2 is a side view of the wiper device of FIG. 1, viewed from a direction of arrow II therein.
Figure 3:
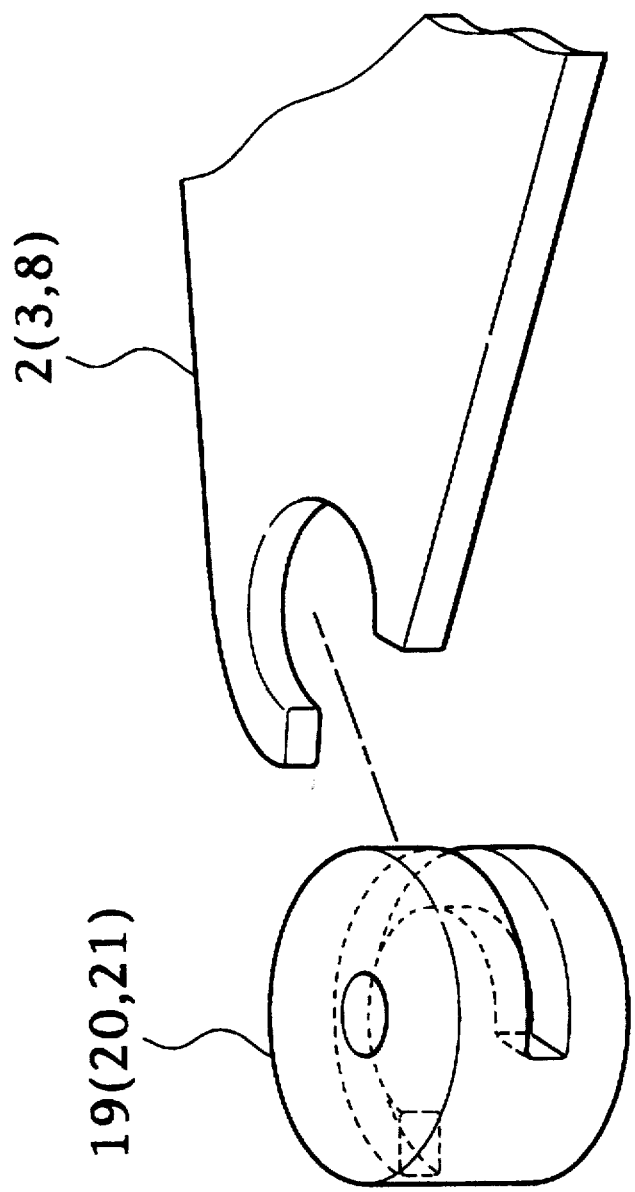
FIG. 3 is an exploded perspective view of a pivot bracket or an unit bracket and an elastic member, showing a connecting relationship therebetween.

In FIGS. 1 and 2, reference numeral 1 designates a wiper device of the present invention, which is manufactured integral with a frame. Note, this kind of wiper device is called as "frame-integrated" wiper device. The wiper device 1 includes a pair of right and left pivot brackets 2, 3 as "wiper pivot sections". The pivot bracket 2 is provided, on one end thereof, with a right wiper pivot 4 to which a wiper arm 18 is to be secured. Similarly, the left pivot bracket 3 is provided, on one end thereof, with a left wiper pivot 5 to which another wiper arm 18 is to be secured.

As shown in FIG. 1, one end of the pivot bracket 2 is connected with one end of a connecting member 6 in the form of a pipe, while one end of the pivot bracket 3 is connected with the other end of the connecting member 6. Secured on the connecting member 6 is an unit bracket 8 on which a wiper motor unit 7 is mounted for pivoting both of the wiper arms 18. On the connecting member 6, the wiper motor unit 7 is positioned close to the right bracket 2.

The wiper device 1 further includes a pair of pivot arms 9, 10 which are to be associated with the wiper arms 18, respectively. For this, the left and right pivot arms 9, 10 have respective ends connected to the wiper pivots 4, 5, respectively. While, the other end of the pivot arm 9 is linked to an end of a first linking member 11 at a right pole joint 12. Similarly, the other end of the pivot arm 10 is linked to the other end of the first linking member 11 at a left pole joint 13.

The above wiper motor unit 7 comprises a wiper motor 22 and a drive arm 14 driven by the wiper motor 22. The drive arm 14 is linked with an end of a second linking member 15 through the intermediary of a ball joint 17. On the other hand, the other end of the second linking member 15 is linked with the end portion of the pivot arm 10 through the intermediary of a pole joints 16 close to the pole joint 13.

With the linking arrangement between the pivot arm 9 and the pivot arm 10 through the first linking member 11 and the linking arrangement between the pivot arm 10 and the drive arm 14 through the second linking member 15, the rotation of the drive arm 14 can be transformed into synchronous angular movements of the wiper pivots 4, 5.

According to the embodiment, at three mounting points 2P, 3P and 8P, the above-constructed wiper device 1 is fixed to a not-shown cowl box on the side of the vehicle body, by mean of bolts, nuts or the like. Note, the mounting point 2P is a locational point where the end of the pivot bracket 2 is arranged, while the mounting point 3P is a locational point where the end of the pivot bracket 3 is arranged. Similarly, the remaining mounting point 8P is the other point where the front end of the unit bracket 8 is arranged. For mounting the wiper device 1 on the vehicle body stably, the mounting point 8P is designed to be shifted from the mounting points 2P, 3P forwardly.

In order to prevent operational noise of the wiper motor unit 7 from transmitting to the cowl box, a right elastic member 19 is interposed between the mounting points 2P on the cowl box and the pivot bracket 2, while a left elastic members 20 is interposed between the mounting points 3P on the cowl box and the pivot bracket 3. Similarly, a center elastic member 21 is interposed between the mounting points 8P on the cowl box and the unit bracket 8. These elastic members 19, 20, 21 may be made of rubber or the like.

Being circular-shaped, the elastic members 19, 20, 21 are fitted on the mounting points 2P, 3P, 8P, respectively. The members 19, 20, 21 are provided on respective outer peripheries with circumferential grooves for engagement with the brackets 2, 3, 8, respectively.

On the other hand, the above wiper motor unit 7 is positioned on the connecting member 6 in a manner that a gravity center G of the unit 7 rides on an imaginary line L passing through the mounting point 2P of the pivot bracket 2 and the mounting point 3P of the pivot bracket 3 substantially. For this, the connecting member 6 is bent so as to be a substantial L-shaped member.

In this way, according to the embodiment, since the gravity center G of the wiper motor unit 7 rides on the line L passing through both of the mounting point 2P and the mounting point 3P, it is possible to restrain an occurrence of rotational moment about the line L, which would be caused by the weight of the wiper unit motor 7 during vehicle's accelerating or decelerating.

Consequently, it allows the mounting points 2P, 3P of the pivot brackets 2, 3 and the mounting point 8P of the wiper motor unit 7 to be fixed securely, so that the stability in mounting the wiper device 1 can be enhanced furthermore.

Further, as mentioned above, it is possible to restrain torsion by the rotational moment from applying on the mounting points 2P, 3P, 8P. Therefore, even if establishing the spring constant of the elastic members 19, 20, 21 low, it would be excluded that the elastic members 19, 20, 21 are bent in front and behind in acceleration or deceleration so that the wiper device 1 interferes with the cowl box. Thus, according to the embodiment, the arrangement makes it possible to realize compatibility of avoiding an interference of the wiper device 1 while improving to reduce the operation noise of the wiper motor unit due to an improvement of vibration isolating effect.

Figure 4:
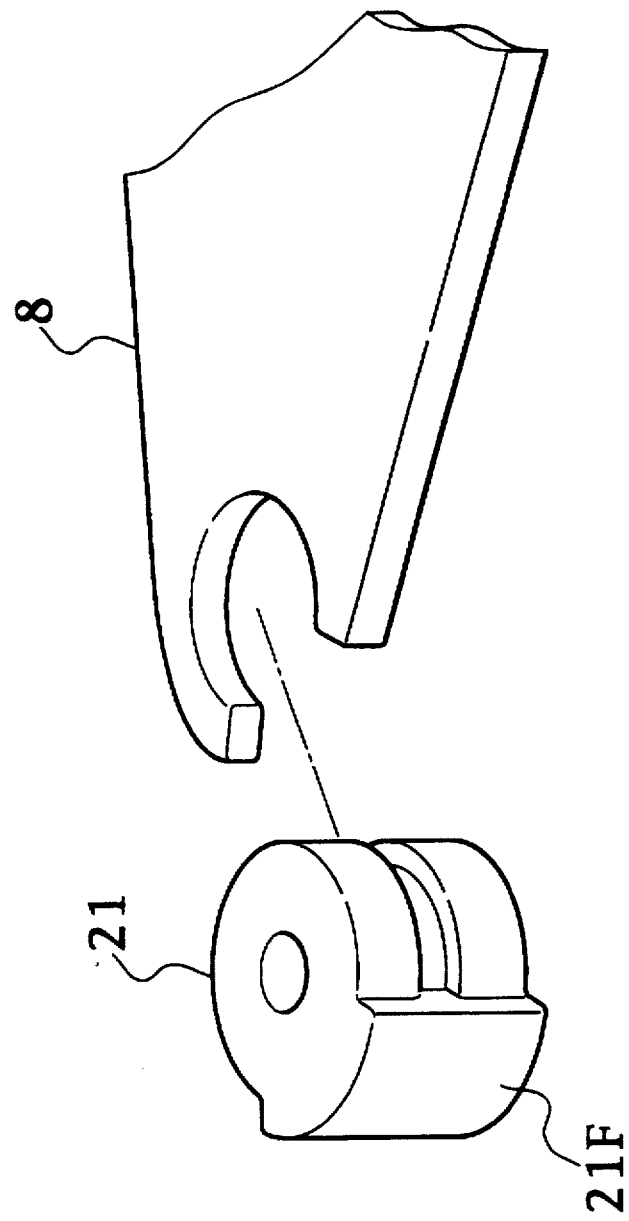
FIG. 4 is an exploded perspective view of the unit bracket and the elastic member, showing the connecting relationship different from that of FIG. 3.

FIG. 4 shows another example of the elastic member 21 attached to the mounting point 8P of the unit bracket 8.

As shown in FIG. 1, since the mounting point 8P of the unit bracket 8 is deviated from the line L passing through the mounting point 2P of the pivot bracket 2 and the mounting point 3P of the pivot bracket 3, the elastic member 21 on the mounting point 8P is subjected to reacting force, which results from the pivotal movements of the wiper arms 18 attached to the wiper pivots 4, 5, particularly, at a front portion 21F of the member 21 existing in a direction perpendicular to the line L.

Therefore, according to the embodiment, the elastic member 21 is partially enlarged at the front portion 21F in the form of a substantial fan, so that the spring constant of the elastic member 21 increases at that portion 21F locationally.

In this way, by increasing the spring constant of the elastic member 21 locationally, it is possible to reduce the spring constant of other portions besides the front portion 21F furthermore while the elastic supportability is maintained. Thus, owing to vibration isolating operation of the elastic member 21 allocated to the mounting point 8P for the wiper motor unit 7 as a source of vibration, it is possible to enhance the reduction effect for noise of the wiper motor unit in operation furthermore.

Again, since the front portion 21F of the elastic member 21 is enlarged so as to be a substantial fan, contact area of the portion 21F with a surface of the cowl box can be increased to progress the elastic supporting stability due to the portion 21F.

Figure 5:
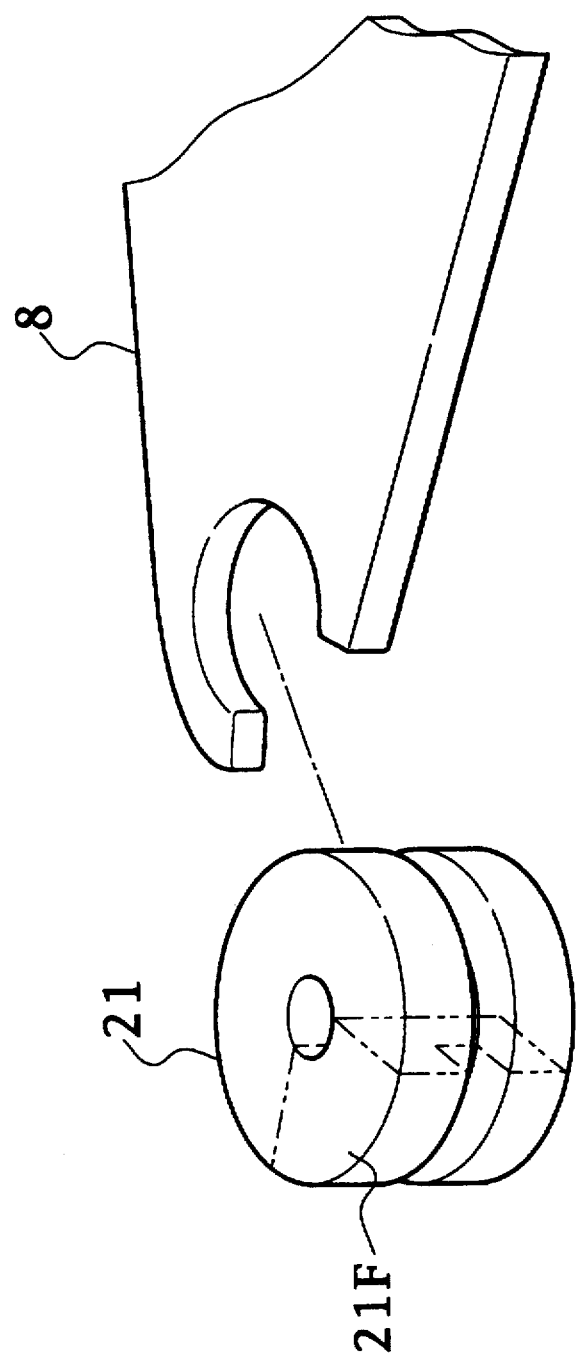
FIG. 5 is a perspective view similar to FIG. 3, showing a further different connecting relationship between the unit bracket and the elastic member.

FIG. 5 shows another arrangement for increasing the spring constant of the front portion 21F of the elastic member 21. According to the embodiment shown in the figure, the elastic member 21 is provided with the front portion 21F made of elastic material of which spring constant is larger than that of the remaining portion of the member 21. Of course, the front portion 21F is formed integral with the remaining portion, as shown with broken lines of FIG. 5. In this case, since the elastic member 21 can be formed to have a simple circular configuration without enlarging partially, it is possible to facilitate the "lay-out" arrangement of the elastic member 21 itself.

Finally, it will be understood by those skilled in the art that the foregoing description is preferred embodiments of the disclosed wiper device, and that various changes and modifications may be made to the present invention without departing from the spirit and scope thereof.

What is claimed is:

1. A wiper device for a vehicle, comprising:

a pair of left and right pivot brackets attached to a vehicle body of the vehicle through intermediary of a pair of left and right elastic members at left and right mounting points on said vehicle body, respectively;

a pair of left and fight pivots pivotably mounted to said left and right pivot brackets, respectively;

a pair of wiper arms attached to respective ends of said left and right pivots for wiping a windshield of the vehicle;

a connecting member having one end linked to the end of said left pivot bracket and the other end linked to the end of said right pivot bracket;

a wiper motor unit positioned between said left pivot bracket and said right pivot bracket, said wiper motor unit including a wiper motor for pivoting said wiper arms and a unit bracket mounting said wiper motor on said connecting member, said unit bracket being attached to the vehicle body through a center elastic member at a center mounting point shifted forwardly from an imaginary line passing through both of said left and right mounting points;

a pair of left and right pivot arms attached to respective second ends of said left and right pivots;

a first linking member having respective ends linked to ends of said left and right pivot arm through ball joints, respectively; and a second linking member having one end coupled with said wiper motor and the other end linked to one end of said first linking member;

wherein said unit bracket of said wiper motor unit is positioned on said connecting member so that a gravity center of said wiper motor unit rides on said imaginary line.

2. A wiper device for a vehicle as claimed in claim 1, wherein said connecting member is bent forwardly so that the gravity center of said wiper motor unit rides on said imaginary line.

3. A wiper device for a vehicle as claimed in claim 2, wherein said connecting member is formed as a pipe.

4. A wiper device for a vehicle as claimed in claim 1, wherein said center elastic member is provided, in a direction perpendicular to said imaginary line, with a front portion of which spring constant is increased in comparison with that of remaining portions of said center elastic member.

5. A wiper device for a vehicle as claimed in claim 4, wherein said front portion of said center elastic member is formed to project radially outward, providing a fan-shaped configuration.

6. A wiper device for a vehicle as claimed in claim 5, wherein said center elastic member has a circumferential groove formed thereabout for engagement with said unit bracket.

7. A wiper device for a vehicle as claimed in claim 4, wherein said front portion of said center elastic member is made of elastic material which is different from that of remaining portions of said center elastic member.

8. A wiper device for a vehicle as claimed in claim 7, wherein said center elastic member has a circumferential groove formed thereabout for engagement with said unit bracket.

* * * * *